March 28, 1967 B. RAPSON ETAL 3,311,362
REFRACTORY GAS SEAL
Filed Sept. 30, 1964
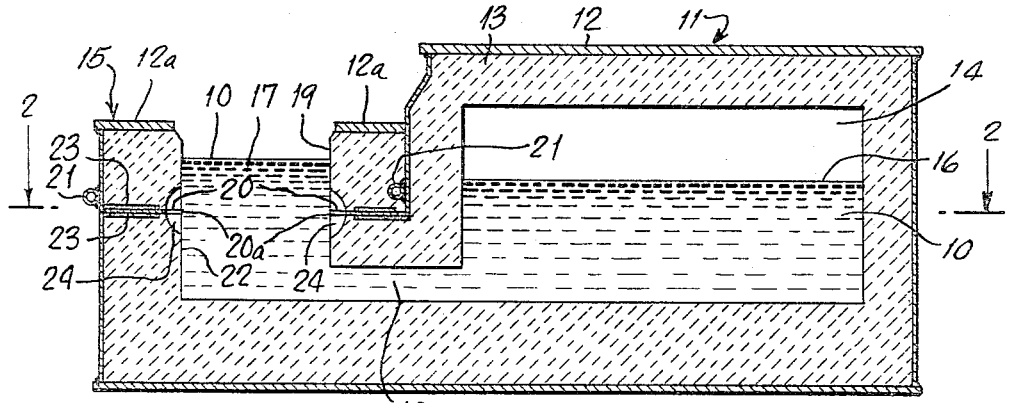
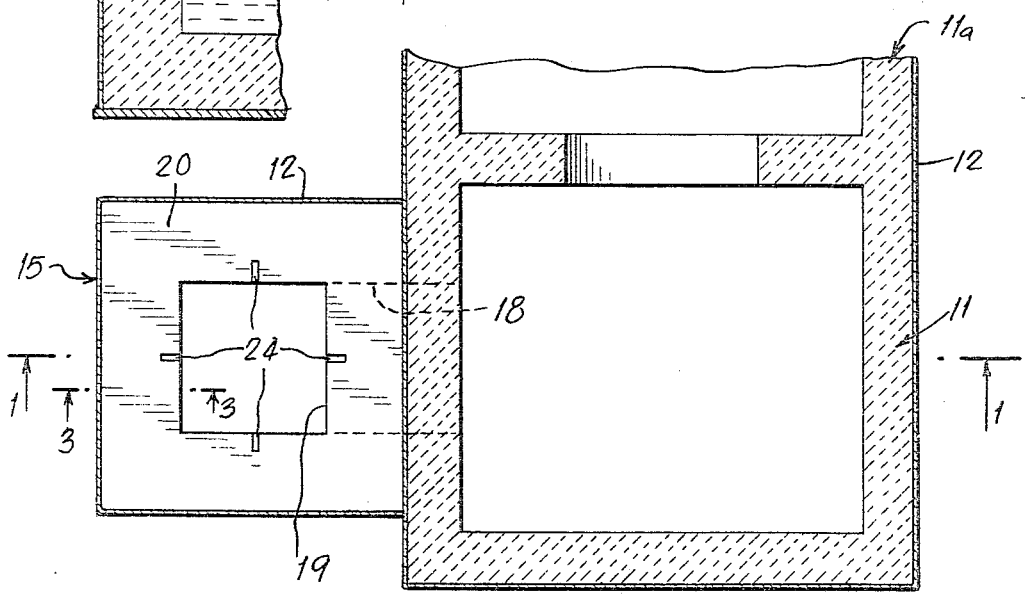
INVENTORS
BRYAN RAPSON
FREDERICK WILLIAM SOUTHAM
BY
Robert S. Dunham
ATTORNEY 3,311,362
REFRACTORY GAS SEAL
Bryan Rapson and Frederick William Southam, Arvida, Quebec, Canada, assignors to Aluminium Laboratories Limited, Montreal, Quebec, Canada, a corporation of Canada
Filed Sept. 30, 1964, Ser. No. 400,381
12 Claims. (Cl. 266—34)

This invention relates to sealing of refractory chambers, and more particularly relates to sealing refractory walls in chambers containing molten metal or salts against passage of gases along and within said refractory walls.

In many refining and processing situations a molten metal or salt is enclosed in a chamber not open to the atmosphere above the level of the metal or salt. This situation often produces a pressure in the gas space above the molten material which is higher or lower than atmospheric pressure. When additionally, for whatever reason, a passage leads from the body of said molten material to a region open to the atmosphere, a pressure differential will exist between the ends of the passage. This pressure differential, in the usual case where refractory materials line the chamber and the passageway, may result (when the chamber is above atmospheric pressure) in passage of the gases from a higher pressure region above the molten bath through and along and within the refractory wall path and hence ultimately to the atmosphere where they are free to escape. It is also possible for atmospheric gas to flow into the chamber via the refractory wall path when the chamber is below atmospheric pressure.

In general, in many such situations this result is deleterious for economic or other reasons, as will be realized by those skilled in the metals extraction and refining arts.

In one particular form of metal refining, with which the present invention is advantageously employed, the problem of such escapage of gas is quite important. This process is the so-called subhalide distillation process for the refining of aluminum metal, wherein gaseous normal aluminum halide (especially aluminum chloride, or alternatively aluminum bromide) is employed to convert aluminum metal, from an impure body thereof, to gaseous aluminum monohalide (e.g., monochloride or monobromide) which is thereafter decomposed to yield purified metal and a restored quantity of the normal halide. This process, and typical apparatus for effectuating it, is taught in U.S. Patents 2,914,398 and 2,937,082, both to A. H. Johnston et al.

In a particularly effective form of this subhalide process, the normal aluminum halide, preferably preheated, is brought in gaseous or vapor state into contact with impure or contaminated aluminum-bearing material, for the above reaction which converts aluminum of such material into the gaseous subhalide state, e.g., the monochloride, such reaction being effected at elevated temperature in a suitable chamber or furnace or equivalent device, conveniently called a converter. The gaseous subhalide, usually also carrying a quantity of unreacted normal halide, is then conducted to a vessel or device serving as a decomposer (sometimes also called a condenser), where at a lower temperature a reverse chemical reaction occurs, involving the dissociation of the subhalide to yield relatively pure aluminum metal which is collected as the product. This reverse reaction also yields the normal halide, thus restoring the latter to the gas stream, so that the gaseous discharge from the decomposer consists essentially, or for the most part, of such normal halide, made up of the previously unreacted quantity and the restored quantity.

Clearly in the aforesaid subhalide process the aluminum halide vapors are not merely by-product gases, but are an intermediate product employed in the process and from which the ultimate aluminum values are derived. Any loss, therefore, of aluminum halide vapors detracts from overall process economy and efficiency. Moreover aluminum trichloride vapors tend to hydrolyze in contact with moist air to form highly corrosive hydrogen chloride, which in contact with further moisture produces hydrochloric acid. Thus for reasons of basic process efficiency, industrial cleanliness, municipal and plant safety, and avoidance of corrosion of plant equipment, the prevention of the escape of aluminum halide vapors by means of the refractory paths, as aforesaid, must be prevented.

However, the densest and otherwise most satisfactory refractory materials have been found permeable to aluminum halide vapors under moderate pressure differentials of the order of magnitude to be expected in the subhalide process. Moreover the highly destructive attributes of molten aluminum have been such as to discourage all non-refractory methods of retaining these gases.

It is accordingly a principal object of the present invention to provide a refractory gas seal that prevents passage of gas under pressure through or along and within the refractory wall itself.

Another object of the invention is to provide such a seal in the subhalide process for the refining of aluminum.

Another object of the invention is to provide such a seal in a refractory wall or passageway between a chamber containing molten material with a gas space thereabove at greater than atmospheric pressure and an interconnecting region open to the atmosphere.

Another object of the invention is to provide a refractory gas seal so arranged as to prevent leakage of gas in either direction between the atmosphere and the chamber and to resist the destructive action of molten aluminum.

Another object of the invention is to provide a refractory gas seal that increases the efficiency and safety of equipment containing refractory walls and employed in the subhalide process for the refining of aluminum metal.

These and other objects and advantages of the invention will be fully understood upon examination of the detailed description of one illustrative embodiment of the inventive principles contained hereinbelow, when taken with the drawings in which like reference characters denote like parts in all views thereof, and in which:

FIGURE 1 is a vertically sectioned view of metal refining apparatus employing the refractory seal of the present invention, FIGURE 2 is a plan view of a portion of the unsectioned apparatus of FIGURE 1 taken along line 2—2 therein, and FIGURE 3 is a partial view of the apparatus of FIGURE 1 showing a detail thereof in section viewed along line 3—3.

Referring now to the drawings, in the subhalide process occasion is had to contain an aluminum melt 10 within a chamber indicated generally at 11 and comprising a gas impervious metallic shell 12 lined with refractory brick 13. At all points where the refractory brick 13 abuts the chamber shell 12, it is desirable to interpose a layer of insulating refractory material (not shown) such as vermiculite. The invention is equally applicable to other types of chambers lined with refractory brick for the processing of other kinds of melt, either metallic or non-metallic. These other situations will, however, have in common the same gas leakage problem as hereinafter explained, and accordingly, the invention will be beneficial and useful in these and other situations as well as in the presently described process.

Specifically, in the subhalide process the chamber 11 may represent a decomposer wherein molten aluminum is intimately contacted with aluminum trihalide gas as was already explained, although of course, the present invention is not limited in the subhalide process to use in the decomposer stage. Rather the principle of the invention may be used wherever a gas is urged to migrate within the refractory wall under a pressure differential.

During the subhalide process the pressure of the gases (chiefly aluminum trichloride) in the gas space 14 above the melt 10 often rises above atmospheric. Pressures of 30 mm. of mercury above atmospheric are common. At points within the apparatus employed in the subhalide process, portions of the liquid melt are exposed to the atmosphere, as for example, in the skimming well. Of course, in other processes involving confined melts other similar situations will prevail wherein a portion of the melt is exposed to the atmosphere.

The skimming well 15 forms an appendage to the decomposer chamber 11 as shown in FIGURE 2. As is also shown in FIGURE 2, the decomposer 11 is one stage in a multi-stage decomposer, a second stage 11a of which is partially shown. For present understanding it is sufficient to note that no gas (aluminum trichloride, chiefly) can escape from the complex of one or more decomposer stages 11 by a direct route, that is, via the decomposer chamber wall 12, generally fabricated in sheet steel, or via the melt 10 itself. However, the surface 17 of the melt 10 appearing within the skimming well 15 is necessarily at atmospheric pressure, and a differential pressure can thus exist between surface 16 within decomposer chamber 11 and surface 17 within skimming well 15. In the subhalide process this differential will normally be toward surface 17, i.e. the pressure at surface 16 will be higher than that at surface 17. Thus surface 17 is usually depressed relative to surface 16, as is shown in FIGURE 1. However, it is contemplated that invasion of chamber 11 by atmospheric gas caused by a lesser pressure at surface 16 than at surface 17 is also prevented. In the subhalide process, for example, such invasion by air would be highly deleterious. Thus it is seen that the present invention operates equally to prevent gas migration in one direction (surface 17 to 16) as in the other direction (surface 16 to 17).

As aforesaid, the action of molten aluminum on steel is very destructive, and for this and other reasons it is necessary to provide the aforesaid refractory bricks 13 and insulating layer lining the chamber 11, and extending to the skimming well 15 and the interconnecting melt passageway 18. Now although the gas within gas-space 14 cannot escape the chamber 11 by the direct route as aforesaid, it has been found that even dense 99% alumina refractory brick is not impervious to migration of a gas under a differential pressure. Consequently under conditions of greater pressure at surface 16, the aluminum trihalide gas is forced into the refractory bricks within chamber 11 and thence to the refractory bricks lining passageway 18 and thence to the refractory bricks lining skimming well 15 and thence to the atmosphere. This causes the loss of aluminum values from the process, and the production of hydrogen chloride in the atmosphere.

The steel enclosure shell 12 forming the outside of decomposer chamber 11 extends completely around the chamber 11 and also around the outside of skimming well 15 and interconnecting passageway 18. However it is impossible to employ this steel shell 12 to prevent the gas from escaping at, for example, portion 19 of the refractory wall because to do so the shell 12 would have to extend down alongside portion 19 and into the melt below surface 17. This is so because gas can bubble out of the refractory brick and into the melt itself at the point where the differential pressure behind the gas just exceeds the pressure of the height of melt thereabove. Thus within skimming well 15 gas can bubble into melt 10 a distance below surface 17. That distance will, in an example case of a pressure differential of 30 mm. of mercury, be $$30 \text{ mm.} \times \frac{\text{density of Hg}}{\text{density of Al}}$$

below the surface 17. Thus it is clear that to prevent escape to the atmosphere from the refractory bricks by means of shell 12, the shell would have to extend along the top of the refractory bricks as cap 12a (as shown) and then downwardly along portion 19 around the perimeter of the skimming well 15, and most importantly, into the melt 10 and below surface 17 to the depth required to prevent bubbling. This is not a solution to the problem because such a steel shell section would be attacked by the molten aluminum and prevention of this attack is one of the purposes of the refractory in the first place. Instead, the present invention teaches the use of no such depending steel section, and thus avoids any possibility of attack by the changing level of surface 17. Escape of gas to the atmosphere above or below surface 17 is prevented by other means, as hereinafter explained.

A thin metallic sheet or web 20 is welded or otherwise secured to outer shell 12 and is disposed generally horizontally around the perimeter of skimming well 15, as shown in FIGURES 2 and 3. A thin web 20 is preferred, because it will not expand appreciably in its small (vertical) dimension. The web 20 is very much thinner, in practice, than the shell 12 of the enclosure. Thus spreading (or cracking) of the refractory bricks immediately above and below the web is avoided. Such spreading or cracking can allow penetration by the melt. Although the outer edge 20a of the web 20 contacts the melt, heat is conducted away by the web to the shell 12 fast enough so that attack of the edge 20a is not a problem. To aid this process, cooling pipes 21 are provided for carrying cooling fluid and providing a heat sink at the portion of shell 12 adjacent the junction with web 20.

The web 20 is located a sufficient depth below surface 17 so that bubbling of gas from the refractory wall from, for example, the portion 22 just below the web, cannot occur. The pressure of the aluminum at that depth is arranged to be greater than the gas pressure differentials to be encountered. This is achieved by calculating the depth by the aforesaid formula relating the pressure differential to the pressure per unit depth of the liquid (e.g., molten Al) concerned, or by experiment. By employing such a web 20, the refractory gas escape path is blocked off without affording an appreciable area for the melt to attack. It has been found desirable to coat the web with a refractory cement (e.g., Fiberfrax QF–180 Coating Cement, manufactured by The Carborundum Company) to prevent attack, and to further coat the web on both sides with an insulation 23 comprising an inner layer of refractory felt (e.g., ½" Fiberfrax Type XV Felt by the same manufacturer) with an outer layer of refractory board (e.g., ¼" Fiberfrax Type XB Board by the same manufacturer).

As is shown in FIGURE 2, the web 20 extends completely around the refractory wall of skimming well 15. Notches 24 in web 20 serve as expansion points for lateral expansion of the web. Cracking of the refractory bricks is thus prevented. The notches in the web are commensurate with notches in the bricks which extend above and below the web notches. Gas thus cannot escape at or bypass the web at the notches because molten aluminum fills them, and circulates therein. As is shown in FIGURE 3, the web 20 extends to the molten metal 10, where it presents the contact edge 20a. Within the notches themselves however, as is shown in FIGURE 2, the contact edge 20a extends around the entire notch 24 periphery, since the molten metal 10 enters the notch 24. Notches in the web alone would similarly prevent gas by-passage, but the chance of solidifying of aluminum in such small notches (with resultant refractory cracking) is great. The additional vertical refractory notch-continuations thus foster solidification—defeating circulation of the melt therein.

In operation, a melt is contained within chamber 11 and exposed to the atmosphere at suface 17. The pressure within closed gas-space 14 does not cause escape of the gas via the refractory path because web 20 blocks the refractory path and is located within the refractory wall of skimming well 15 at a depth sufficient to prevent escape of gas into the melt. The metallic web 20 (which may even be steel) is not attacked by contact with the melt at 20a because of the heat sink at 21 which cools the web 20 at a sufficient rate to keep the edge 20a at a temperature below the eutectic between the web metal and aluminum (with steel: below approximately 655° C). Expansion difficulties are prevented with melt-filled notches 24. The operation of the subhalide chamber 11 thus proceeds without loss of aluminum values (in aluminum trichloride gas) to the atmosphere, or the unsafe and undesirable production of atmospheric hydrogen chloride. In those cases where the pressure at surface 16 is less than atmospheric, no air is allowed to enter chamber 11 from well 10.

The invention has been described with reference to a presently preferred, but nevertheless illustrative, embodiment. It is to be understood that variations may be practiced that depart from the described apparatus, but that fall within the invention itself.

What is claimed is:

1. Refractory apparatus comprising first means containing a body of molten material having a first surface with a first gas-space thereover, second means interconnecting with said body of molten material below said first surface and containing a portion of said molten material having a second surface with a second gas-space thereover, refractory material lining the interior of said first and second means so as to form a refractory path from one to the other, means sealing said refractory path against passage therein of gas between said first means gas-space and said second means gas-space under the influence of a differential pressure caused by greater gas pressure at one of said surfaces than at the other of said surfaces comprising a continuous web set within said refractory path a distance below said other of said surfaces where the fluid static pressure of the melt is at least equal to said differential gas pressure and completely closing off said refractory path to gas flow.

2. Refractory apparatus comprising first means containing a body of molten material having a first surface with a first gas-space thereover, second means interconnecting with said body of molten material below said first surface and containing a portion of said molten material having a second surface with a second gas-space thereover, refractory material lining the interior of said first and second means so as to form a refractory path from one to the other, means sealing said refractory path against passage therein of gas between said first means gas-space and said second means gas-space under the influence of a differential pressure caused by greater gas pressure at the first said surface than at the second comprising a continuous substantially horizontal web set within said refractory path a distance below said second surface where the fluid static pressure of the melt is at least equal to said differential gas pressure and completely closing off said refractory path to gas flow.

3. Refractory apparatus comprising first means containing a body of molten material having a first surface with a first gas-space thereover, second means interconnecting with said body of molten material below said first surface and containing a portion of said molten material having a second surface with a second gas-space thereover, refractory material lining the interior of said first and second means so as to form a refractory path from one to the other, means sealing said refractory path against passage therein of gas between said first means gas-space and said second means gas-space under the influence of a differential pressure caused by greater gas pressure at the first said surface than at the second comprising a continuous substantially horizontal web set within said refractory path a disance below said second surface where the fluid static pressure of the melt is at least equal to said differential gas pressure and completely closing off said refractory path to gas flow, and heat-sink means connecting with said web and adapted to withdraw heat therefrom.

4. Refractory apparatus comprising first means containing a body of molten aluminum having a first surface with a first gas-space thereover containing aluminum trichloride gas, second means interconnecting with said body of molten aluminum below said first surface and containing a portion of said molten aluminum having a second surface with a second gas-space thereover, refractory material lining the interior of said first and second means so as to form a refractory path from one to the other, means sealing said refractory path against passage therein of gas between one of said gas-spaces and the other of said gas-spaces under the influence of a differential pressure caused by greater gas pressure at one of said surfaces than at the other of said surfaces comprising a continuous web set within said refractory path a distance below said other of said surfaces where the fluid static pressure of the melt is at least equal to said differential gas pressure and completely closing off said refractory path to gas flow.

5. Refractory apparatus comprising first means containing a body of molten aluminum having a first surface with a first gas-space thereover containing aluminum trichloride gas, second means interconnecting with said body of molten aluminum below said first surface and containing a portion of said molten aluminum having a second surface open to the atmosphere, refractory material lining the interior of said first and second means so as to form a refractory path from one to the other, means sealing said refractory path against passage therein of aluminum trichloride gas from said first means gas-space to said second means gas-space under the influence of a differential pressure caused by greater gas pressure at the first said surface than at the second comprising a continuous substantially horizontal web set within said refractory path a distance below said second surface where the fluid static pressure of the melt is at least equal to said differential gas pressure and completely closing off said refractory path to gas flow.

6. Refractory apparatus comprising first means containing a body of molten aluminum having a first surface with a first gas-space thereover containing aluminum trichloride gas, second means interconnecting with said body molten aluminum below said first surface and containing a portion of said molten aluminum having a second surface open to the atmosphere, refractory material lining the interior of said first and second means so as to form a refractory path from one to the other, means sealing said refractory path against passage therein of atmospheric gas from said second means gas-space to said first means gas-space under the influence of a differential pressure caused by greater gas pressure at the second said surface than at the first comprising a continuous substantially horizontal web set within said refractory path a distance below said first surface where the fluid static pressure of the melt is at least equal to said differential gas pressure and completely closing off said refractory path to gas flow.

7. Refractory apparatus comprising first means containing a body of molten aluminum having a first surface with a first gas-space thereover containing aluminum trichloride gas, second means interconnecting with said body of molten aluminum below said first surface and containing a portion of said molten aluminum having a second surface open to the atmosphere, refractory material lining the interior of said first and second means so as to form a refractory path from one to the other, means sealing said refractory path against passage therein of aluminum trichloride gas from said first means gas-space to the atmosphere over said second surface under the influence of a differential pressure caused by greater gas pressure at the first said surface than at the second comprising a continuous substantially horizontal web set within said refractory path a distance below said second surface where the fluid static pressure of the melt is at least equal to said differential gas pressure and completely closing off said refractory path to gas flow, and heat-sink means connecting with said web and adapted to withdraw heat therefrom.

8. Refractory apparatus comprising first means containing a body of molten aluminum having a first surface with a first gas-space thereover containing aluminum trichloride gas, second means interconnecting with said body of molten aluminum below said first surface and containing a portion of said molten aluminum having a second surface open to the atmosphere, refractory material lining the interior of said first and second means so as to form a refractory path from one to the other, means sealing said refractory path against passage therein of aluminum trichloride gas from said first means gas-space to the atmosphere over said second surface under the influence of a differential pressure caused by greater gas pressure at the first said surface than at the second comprising a continuous substantially horizontal metallic web set within said refractory path a distance below said second surface where the fluid static pressure of the melt is at least equal to said differential gas pressure and completely closing off said refractory path to gas flow, an inner edge of said web contacting said molten aluminum, and heat-sink means connecting with said web and adapted to withdraw heat therefrom at a sufficient rate to prevent a substantial portion of said inner edge from reaching the eutectic temperature of its material with aluminum.

9. Refractory apparatus comprising first means containing a body of molten aluminum having a first surface with a first gas-space thereover containing aluminum trichloride gas, second means interconnecting with said body of molten aluminum below said first surface and containing a portion of said molten aluminum having a second surface open to the atmosphere, refractory material lining the interior of said first and second means so as to form a refractory path from one to the other, means sealing said refractory path against passage therein of aluminum trichloride gas from said first means gas-space to the atmosphere over said second surface under the influence of a differential pressure caused by greater gas pressure at the first said surface than at the second comprising a continuous substantially horizontal steel web set within said refractory path a distance below said second surface where the fluid static pressure of the melt is at least equal to said differential gas pressure and completely closing off said refractory path to gas flow, an inner edge of said steel web contacting said molten aluminum, and heat-sink means connecting with said web and adapted to withdraw heat therefrom at a sufficient rate to prevent a substantial portion of said inner edge from reaching the steel-aluminum eutectic temperature.

10. Refractory apparatus comprising first means containing a body of molten aluminum having a first surface with a first gas-space thereover containing aluminum trichloride gas, second means interconnecting with said body of molten aluminum below said first surface and containing a portion of said molten aluminum having a second surface open to the atmosphere, refractory material lining the interior of said first and second means so as to form a refractory path from one to the other, means sealing said refractory path against passage therein of aluminum trichloride gas from said first means gas-space to the atmosphere over said second surface under the influence of a differential pressure caused by greater gas pressure at the first said surface than at the second comprising a continuous substantially horizontal web set within said refractory path a distance below said second surface where the fluid static pressure of the melt is at least equal to said differential gas pressure and completely closing off said refractory path to gas flow, expansion notches within said web at an inner edge contacting said molten aluminum, notches within said refractory material congruent with said web notches and extending above and below same for circulation of molten aluminum therein, and heat-sink means connecting with said web and adapted to withdraw heat therefrom.

11. Refractory apparatus comprising first means containing a body of molten aluminum having a first surface with a first gas-space thereover containing aluminum trichloride gas, second means interconnecting with said body of molten aluminum below said first surface and containing a portion of said molten aluminum having a second surface open to the atmosphere, refractory material lining the interior of said first and second means so as to form a refractory path from one to the other, means sealing said refractory path against passage therein of aluminum trichloride gas from said first means gas-space to the atmosphere over said second surface under the influence of a differential pressure caused by greater gas pressure at the first said surface than at the second comprising a continuous substantially horizontal metallic web set within said refractory path a distance below said second surface where the fluid static pressure of the melt is at least equal to said differential gas pressure and completely closing off said refractory path to gas flow, expansion notches within said web at an inner edge contacting said molten aluminum, notches within said refractory material congruent with said web notches and extending above and below same for circulation of molten aluminum therein, and heat-sink means connecting with said web and adapted to withdraw heat therefrom at a sufficient rate to prevent a substantial portion of said inner edge from reaching the eutectic temperature of its material with aluminum.

12. Refractory apparatus comprising first means containing a body of molten aluminum having a first surface with a first gas-space thereover containing aluminum trichloride gas, second means interconnecting with said body of molten aluminum below said first surface and containing a portion of said molten aluminum having a second surface open to the atmosphere, refractory material lining the interior of said first and second means so as to form a refractory path from one to the other, means sealing said refractory path against passage therein of aluminum trichloride gas from said first means gas-space to the atmosphere over said second surface under the influence of a differential pressure caused by greater gas pressure at the first said surface than at the second comprising a continuous substantially horizontal steel web coated with a refractory material and set within said refractory path a distance below said second surface where the fluid static pressure of the melt is at least equal to said differential gas pressure and completely closing off said refractory path to gas flow, expansion notches within said web at an inner edge contacting said molten aluminum, notches within said refractory material congruent with said web notches and extending above and below same for circulation of molten aluminum therein, and heat-sink means connecting with said web and adapted to withdraw heat therefrom at a sufficient rate to prevent a substantial portion of said inner edge from reaching the steel-aluminum eutectic temperature.

No references cited.

J. SPENCER OVERHOLSER, *Primary Examiner.*

E. MAR, *Examiner.*